METHOD FOR IMPROVING THE CENTERING OF STAMPING MATRICES

Filed Feb. 27, 1973

United States Patent Office 3,801,476
Patented Apr. 2, 1974

3,801,476

METHOD FOR IMPROVING THE CENTERING OF STAMPING MATRICES

Klaus Röschmann and Alwin Wühle, Nortorf, Germany, assignors to Teldec Telefunken-Decca Schallplatten GmbH, Hamburg, Germany Filed Feb. 27, 1973, Ser. No. 336,216
Claims priority, application Germany, Mar. 1, 1972, P 22 09 689.5, P 72 07 723.7
Int. Cl. B29d *17/00;* C23b *7/00*
U.S. Cl. 204—5 4 Claims

ABSTRACT OF THE DISCLOSURE

The care and accuracy of centering the negative, e.g. the master or stamping matrix, used in the production of sound and video record discs is improved by preparing the original lacquer foil record so that the negative will have a profile which extends centrically to the record groove spiral. This is accomplished by, prior to the cutting of the spiral groove containing the recorded information into the lacquer foil, inserting a centering core, which has a central bore of a diameter sufficient to accept the spindle of the recorder turntable and has a laterally extending annular flange defining a galvanically reproducible centering edge, into a centering hole in the foil and then, after placing the lacquer foil with the centering core on the recorder turntable, placing a centering sleeve with two concentric bores over the spindle of the recorder turntable to engage the centering edge of the core with one bore and to engage the spindle with the other bore so as to centrically position the lacquer foil about the spindle. When high cutting disc speeds are employed, the sleeve is preferably fastened to the spindle. The sleeve may be formed by conventional machining methods or by galvanic action.

BACKGROUND OF THE INVENTION

The present invention relates to a method for centering the pressing matrices or other negatives made from lacquer foils having grooves of sound and video recordings for the subsequent sound and video record production. It also relates to a method for producing a negative from a lacquer foil for the sound and video record production by galvanic means.

More particularly, the present invention relates to an improved method for producing the centering guide on the matrix or negative whereby the accuracy of the centering of the matrix or negative is maintained independent of the accuracy of the center bore in the lacquer foil original, which bore is adapted to fit over the spindle of the recorder turntable.

In copending U.S. application Ser. No. 201,380, filed Nov. 23, 1971, now Pat. No. 3,749,828, which is assigned to the same assignee as the present application and is incorporated herein in its entirety, there is disclosed a method for providing a lacquer foil original with a centering guide, which guide is reproduced in the subsequently produced negatives. As disclosed in this copending application, this method comprises providing the lacquer foil with a center hole. A hollow centering core is inserted into this center hole. This core contains a bore adapted to closely fit the spindle of the playback system or of the recorder turntable, respectively, and is also provided with a laterally extending flange, the outer edge of which, in contact with the lacquer foil, produces a galvanically reproducible centering edge or guide. The foil with the centering core is placed on the recorder turntable and the spiral groove containing the recording is cut into the lacquer foil. Thereafter a negative of the lacquer foil original, which negative includes the profile of the laterally extending flange, is produced galvanically in a well-known manner.

In the above-mentioned method it is necessary to assure that the inner bore or centering hole of the centering core is concentric with the centering edge or guide which forms the outer diameter of the core.

Experience has shown, however, that when using centering cores composed of two threaded parts which are screwed together, the desired dimensions between the outer diameter of the centering core and the inner bore cannot be maintained when the foil is inserted between the two parts so that the centering core does not have the required fit on the spindle of the recorder turntable.

SUMMARY OF THE INVENTION

The present invention now relates to an improvement in the method of providing for the accurate centering of the centering core and thus of the lacquer foil to receive the sound and/or video recording information so as to result in a more accurately positioned centering edge in a matrix which edge is fitted to the centering system in the press form employed to reproduce records from the matrix.

The above result is achieved according to the present invention, in that the centering of the core and thus of the lacquer foil is effected by the placing over the core of a centering sleeve having one inner bore which corresponds to the diameter of the centering edge of the centering core, i.e. the diameter of the laterally extending flange, and a second inner bore which is adapted to fit the spindle of the recorder turntable.

According to the present invention the centering core is employed to hold the lacquer foil and provide the subsequently required centering edge for the negative and matrix and the centering on the spindle of the lacquer foil held by the core is assured by the centering sleeve. Thus neither the fitting of the bore of the centering core upon the spindle nor the size and precision forming of the bore of the centering core are important any longer.

DESCRIPTION OF THE PREFERRED EMBODIMENTS

Figure 1:
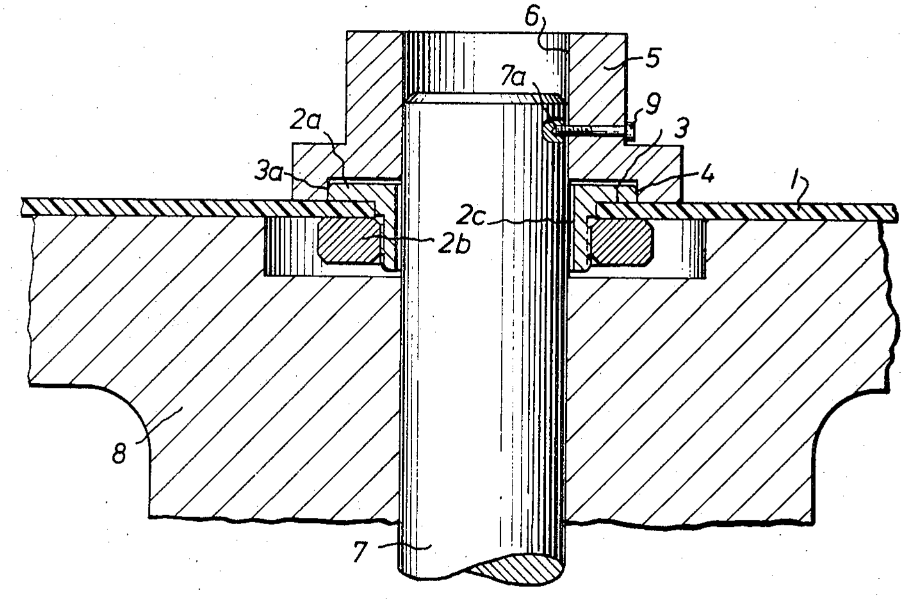
FIG. 1 is a cross-sectional view, partly in section, of a recorder turntable on which a lacquer foil without grooves is positioned in a centered position according to the present invention.

Referring now to FIG. 1, there is shown a lacquer foil 1 clamped between the two screwed-together parts *2a* and *2b* of a centering core inserted in the central hole of the foil. The foil with the centering core *2a*, *2b* is supported on a recorder turntable with the bore *2c* of the centering core loosely fitted around take-up spindle 7 of the recorder turntable 8. The core portion *2a* is provided with a laterally extending annular flange 3 whose upper surface *3a* forms a galvanically reproducible centering edge.

In order to accurately center the centering core *2a*, *2b* on the spindle 7, a centering sleeve 5 is provided. The sleeve 5 has a first bore 4 which has a bore diameter which precisely fits bore 4 over flange 3. The sleeve 5 also contains a second smaller bore 6, which is concentric with and intersects bore 4, and whose bore diameter closely fits the diameter of the spindle 7.

The sleeve 5 is fitted over spindle 7 so that the flange 3 is received in bore 4. Thus the foil 1 with the centering core 2*a*, 2*b* is accurately centered on the spindle 7 with the centering edge of the flange 3 being concentric with the spindle 7. Consequently any possible miscentering of the foil with reference to spindle 7 due to misalignments resulting from the screwing together of the core parts 2*a* and 2*b* is avoided.

Figure 2:
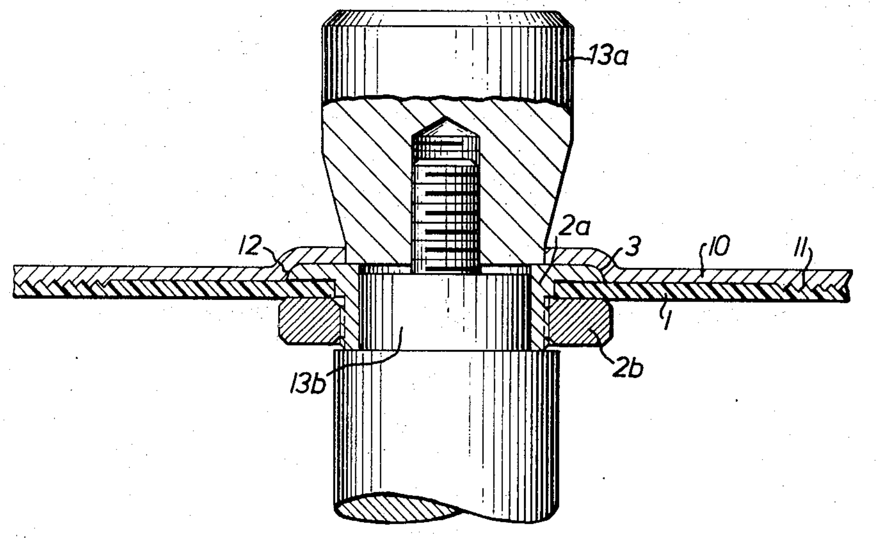
FIG. 2 is a cross-sectional view, partly in section, of a lacquer foil containing grooves cut into the surface after the centering according to the present invention, which foil is shown clamped on a device required for galvanic reproduction and above which foil a galvanically reproduced negative is disposed.

FIG. 2 shows the lacquer foil 1 with the centering core 2*a*, 2*b* clamped between two clamping members 13*a*, 13*b* as is required for the galvanic reproduction of the recordings. The galvanically reproduced negative 10 contains grooves 11 which correspond to the grooves cut into the lacquer foil 1 after the centering as shown in FIG. 1. The negative 10 has a centering edge 12 whose contour corresponds to the profile of the upper surface 3*a* of the flange 3 of the centering core. Just as the grooves cut into the surface of foil 1 were concentric with reference to centering edge 3*a* so the grooves 11 in the galvanically reproduced negative 10 are concentric relative to the edge 12. The centering edge 12 in the galvanically reproduced negative serves, for example in the case of a stamping matrix, to fit the matrix onto the press form containing a centering system whose diameter corresponds to the bore formed by centering edge 12.

When the grooves are to be cut into the foil at high speeds, it has been found to be advantageous to fasten the centering sleeve to the spindle 7 of the recorder turntable 8. For this purpose the spindle 7 shown in FIG. 1 may be provided, for example with a threaded bore 7*a*, into which a bolt 9 passing through a transverse bore in centering sleeve 5 is threaded.

While the centering sleeve 5 may be formed by machining methods, it has been found to be of advantage for the centering sleeve to be made by galvanic reproduction utilizing the matching centering core. For this purpose a centering core part 2*a* of galvanically reproducible material is provided with an accurately centered mandrel of galvanically reproducible material with the diameter of this mandrel corresponding to the outer diameter of the spindle 7 of the recorder turntable 8 as shown in FIG. 1. Then by galvanic action, a negative of the surface of the core and the mandrel in the form of a centering sleeve 5 with bores 6 and 4 is produced.

It will be understood that the above description of the present invention is susceptible to various modifications, changes and adaptations, and the same are intended to be comprehended within the meaning and range of equivalents of the appended claims:

1. In a method for producing a negative from a lacquer foil original recording for the manufacture of record discs containing sound or video recordings, wherein the negative, i.e., a master or a stamping matrix, is galvanically formed from the lacquer foil original recording, in a known manner, the improvement comprising the steps of: providing the lacquer foil with a centering hole; providing a hollow centering core having an inner diameter which is sufficient to fit over the spindle of the recorder turntable and a laterally extending annular flange defining a galvanically reproducible centering edge; providing a centering sleeve having a first bore whose diameter corresponds to the diameter of the spindle of the recorder turntable and a second bore which is concentric with the first bore and whose diameter corresponds to the outer diameter of the laterally extending flange of the centering core; inserting the centering core into the centering hole with the flange extending along the surface of the lacquer foil on which the recording is to be made; placing the lacquer foil with the inserted centering core on the recorder turntable with the spindle thereof passing through the centering core; centering the lacquer foil on the spindle by placing the centering sleeve over the spindle so that the first bore thereof engages the spindle and the second bore thereof engages the laterally extending flange; cutting a spiral groove containing the recording into the lacquer foil; and then forming the negative from the original, whereby the negative will include the profile of the laterally extending flange which profile can then be used to center the negative during subsequent processing.

2. The method as defined in claim 1 comprising the additional step of fastening the centering sleeve to the spindle of the cutting disc after the foil is centered on the spindle and prior to the cutting of the groove.

3. The method as defined in claim 1 wherein said step of providing a centering sleeve comprises forming said centering sleeve by a galvanic process.

4. The method as defined in claim 1 wherein said step of providing a centering sleeve comprises: centering the core on a mandrel of galvanically reproducible material and whose diameter is the same as that of the spindle of the recorder turntable; and, galvanically forming a negative of the mandrel and the core.

References Cited

UNITED STATES PATENTS

| | | | |
|---|---|---|---|
| 2,751,345 | 6/1956 | Osman | 204—5 |
| 2,905,614 | 9/1959 | Porrata et al. | 204—281 |
| 3,481,609 | 12/1969 | Lukens | 274—10 S |

JOHN H. MACK, Primary Examiner

T. TUFARIELLO, Assistant Examiner

U.S. Cl. X.R.

204—281; 274—10 S